(No Model.) 3 Sheets—Sheet 1.

L. & H. G. ROBERTS.
ICE CREAM FREEZER.

No. 511,252. Patented Dec. 19, 1893.

Witnesses.
John E. Bousfield.
G. F. Tyson

Inventors.
L. Roberts
H. G. Roberts

THE NATIONAL LITHOGRAPHING COMPANY,
WASHINGTON, D. C.

(No Model.)　　　　　　　　　　　　　　　　　　　3 Sheets—Sheet 2.
L. & H. G. ROBERTS.
ICE CREAM FREEZER.
No. 511,252.　　　　　　　　　　　Patented Dec. 19, 1893.
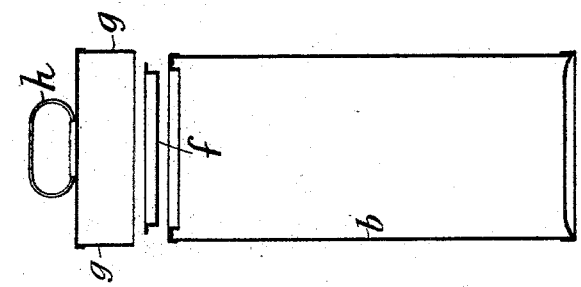
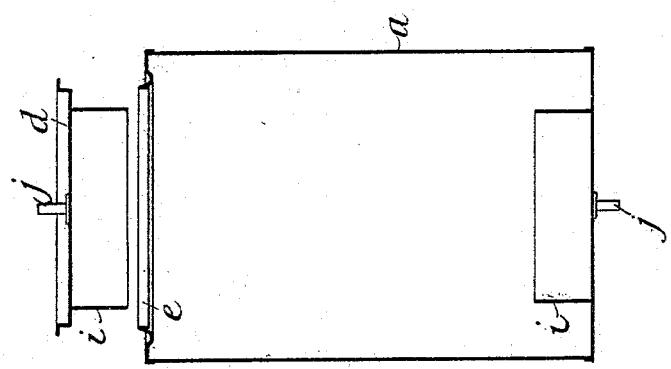
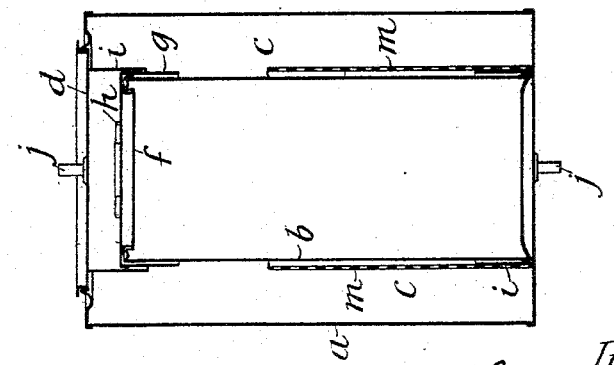
Witnesses　　　　　　　　　　　　　　　　　　Inventors.
John E. Bousfield.　　　　　　　　　　　　　L. Roberts
G. F. Tyson　　　　　　　　　　　　　　　　H. G. Roberts (No Model.) 3 Sheets—Sheet 3.

L. & H. G. ROBERTS.
ICE CREAM FREEZER.

No. 511,252. Patented Dec. 19, 1893.

Witnesses
John E. Bousfield.
G. F. Tyson

Inventors
L. Roberts
H. G. Roberts

UNITED STATES PATENT OFFICE.

LEONARD ROBERTS AND HEDLEY GEORGE ROBERTS, OF LONDON, ENGLAND.

ICE-CREAM FREEZER.

SPECIFICATION forming part of Letters Patent No. 511,252, dated December 19, 1893.

Application filed July 24, 1893. Serial No. 481,306. (No model.)

*To all whom it may concern:*

Be it known that we, LEONARD ROBERTS and HEDLEY GEORGE ROBERTS, subjects of the Queen of Great Britain, residing at London, England, have invented new and useful Improvements in Ice-Cream Freezers, of which the following is a specification.

This invention relates to a novel and simple construction of ice cream freezing apparatus specially adapted for household use.

Our improved apparatus comprises an outer cylinder and one or more inner cylinders of suitable material such as galvanized iron or tinned plate, the space between the outer and inner cylinders being adapted to receive the freezing mixture while the liquid or substances to be frozen are placed in the inner cylinder or cylinders. All the cylinders are provided with air-tight covers at one end, and in some cases at both ends.

Our apparatus is provided with a handle adapted to be fitted to the center of the ends of the apparatus and whereby the apparatus can be rotated by being rolled; or the apparatus may be suspended on centers and rotated.

To enable our invention to be fully understood we will describe how it can be carried into practice by reference to the accompanying drawings, in which—

Figure 1:
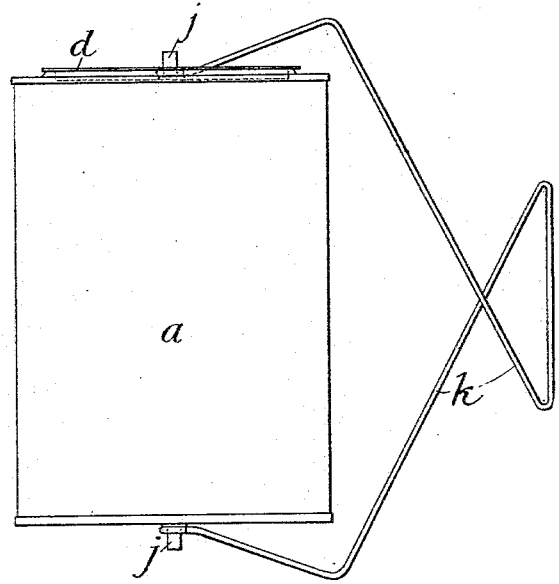
Figure 2:
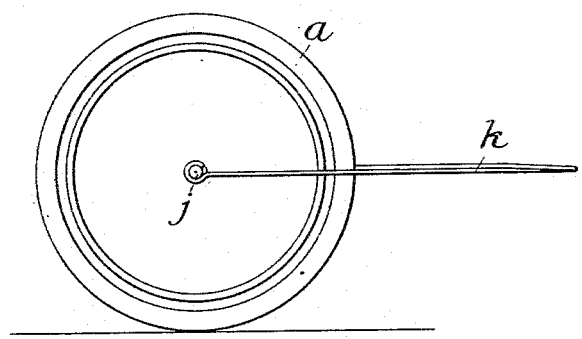
Figure 9:
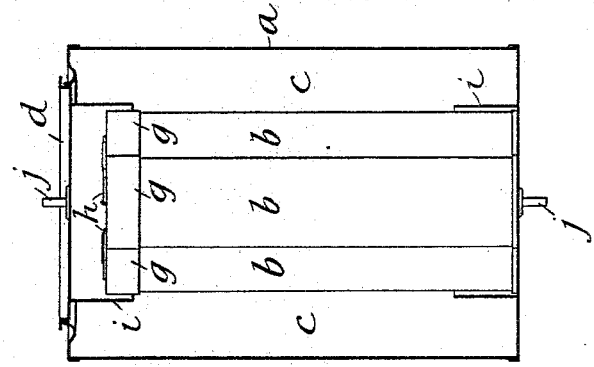
Figure 8:
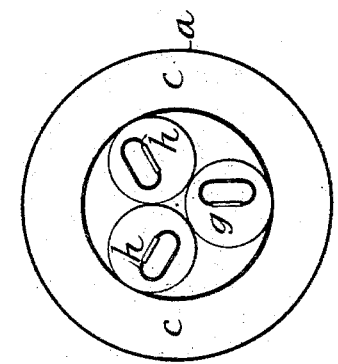
Figure 7:
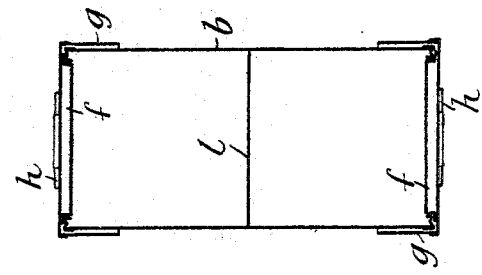
Figure 6:
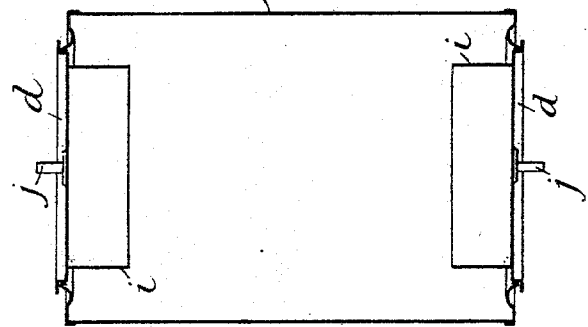

Figures 1 and 2 are respectively a plan and an end view of an ice-cream freezing apparatus constructed according to our invention. Fig. 3 is a longitudinal section of the same with the handle for enabling it to be rotatably removed. Fig. 4 is a longitudinal section of the outer cylinder and its cover separated; and Fig. 5 is a similar view of the inner cylinder with its two covers separated. Figs. 6 and 7 are two sectional views illustrating a modification of our invention; and Figs. 8 and 9 are a plan with the cover of the outer cylinder removed and a sectional elevation respectively illustrating a modification of our invention.

Similar reference letters indicate similar parts throughout the drawings.

$a$ indicates the outer cylinder, and $b$ the inner cylinder of the apparatus, and $c$ indicates the space between the cylinders serving to receive the freezing mixture.

$d$ is the cover of the cylinder $a$, which cover fits within the opening $e$ in one end of the said cylinder so as to form an air-tight joint and is provided with a flange beneath which a lever can be placed for lifting the cover.

$f$, $g$ are two covers with which the cylinder $b$ is provided, the cover $f$ being of similar construction to the cover $d$ of the cylinder $a$ and fitted in a similar manner while the cover $g$ is formed as a cap adapted to fit over the end of the said cylinder $b$. The cover $g$ is advantageously provided with a hinged wire loop handle $h$ to enable the said cover to be removed from the cylinder $b$.

$i$, $i$ are flanges at the two ends of the cylinder $a$ inside the same, the said flanges $i$, $i$ serving to receive or fit over the inner cylinder $b$ so as to retain the same in position during the rotation of the apparatus.

$j$, $j$ are trunnions upon which the apparatus is rotated.

As shown in Fig. 1 a spring-handle $k$ is represented as being attached to the said trunnions $j$, $j$, the said spring-handle serving to suspend the apparatus so that it may be rotated or for pulling it along the ground or other surface.

The cylinders $a$ and $b$ shown in Figs. 1 to 5 are represented as being adapted to open at one end only. In some cases, however, we find it advantageous to construct the cylinders $a$ and $b$ with covers at each end and to form the cylinder $b$ with a partition $l$, as shown in Figs. 6 and 7. By this means two kinds of ice can be formed in the same cylinder. In some cases also instead of providing only two cylinders $a$, $b$ which are concentric with one another we may arrange several small cylinders $b$ within the cylinder $a$, for instance, three cylinders $b$ as shown in Figs. 8 and 9, which cylinders may contain different kinds of ice.

When the inner cylinder $b$ is removed from the outer cylinder the freezing mixture would be liable to fall within the flange $i$ at the bottom. We therefore in some cases provide a perforated shield $m$ outside the flange $i$ as shown in Fig. 3, which flange retains the freezing mixture in it proper position.

Having now particularly described and ascertained the nature of our said invention and in what manner the same is to be performed, we declare that what we claim is—

1. An ice-cream freezer having in combination with an outer cylinder hung on trunnions, an inner cylinder within the same, each cylinder being provided with covers at both its ends, and the inner one having a partition U, as and for the purpose set forth.

2. In an ice-cream freezer, the combination with the inner and outer cylinders hermetically closed and adapted to be rotated as set forth, the flange $i$, and a perforated ice-shield $m$, applied as and for the purpose set forth.

3. The described ice-cream freezer, having in combination the following features, namely: an outer cylinder on trunnions, an inner cylinder, covers at each end of both cylinders, and the outer cylinder having flanges at its ends to fit over the inner cylinder to retain it in position during rotation.

LEONARD ROBERTS.
HEDLEY GEORGE ROBERTS.

Witnesses:
JOHN E. BOUSFIELD,
*Of the firm of J. F. Redfern & Co., 4 South Street, Finsbury, London, Patent Agents.*
G. F. TYSON.